(12) United States Patent
Poegel et al.

(10) Patent No.: US 8,223,888 B2
(45) Date of Patent: Jul. 17, 2012

(54) METHOD AND RECEIVING UNIT FOR THE DETECTION OF DATA SYMBOLS

(75) Inventors: Frank Poegel, Dresden (DE); Eric Sachse, Dresden (DE); Michael Schmidt, Dresden (DE)

(73) Assignee: Atmel Corporation, San Jose, CA (US)

( * ) Notice: Subject to any disclaimer, the term of this patent is extended or adjusted under 35 U.S.C. 154(b) by 1042 days.

(21) Appl. No.: 11/953,007

(22) Filed: Dec. 7, 2007

(65) Prior Publication Data
US 2008/0165834 A1 Jul. 10, 2008

Related U.S. Application Data

(63) Continuation of application No. PCT/EP2006/005175, filed on May 31, 2006.

(30) Foreign Application Priority Data

Jun. 7, 2005 (DE) .......................... 10 2005 026 091

(51) Int. Cl.
*H04L 27/00* (2006.01)
(52) U.S. Cl. ........ 375/316; 375/136; 375/147; 375/142; 375/324; 375/330; 375/341; 375/343
(58) Field of Classification Search .................. 375/136, 375/141, 147, 150, 295, 316, 324, 325, 330, 375/341, 343; 370/203, 204, 205, 207, 208, 370/209, 210; 455/73
See application file for complete search history.

(56) References Cited

U.S. PATENT DOCUMENTS
6,393,067 B1 5/2002 Uesugi (Continued)

FOREIGN PATENT DOCUMENTS
EP 0 763 919 A2 3/1997
(Continued)

OTHER PUBLICATIONS

Adler Robbie: Adaptive Modulation and the IEEE 802.15.4 Standard: "Power and Performance Tradeoffs", EE359 Project, Fall 2004; obtained from the Internet address: http://www.stanford.edu/~radler/project final.pdf using the search engine "Google" on May 5, 2006.

(Continued)

*Primary Examiner* — Dhaval Patel
(74) *Attorney, Agent, or Firm* — Baker Botts L.L.P.

(57) ABSTRACT

A method and device is provided for the detection of data symbols contained in a received radio signal, whereby each data symbol is allocated transmit-side a symbol value-specific PN sequence of successive PN chips in the chip clock and the PN sequences allocated to the data symbols are offset QPSK modulated. The method of the invention for incoherent detection provides for converting the received radio signal into a complex baseband signal sampled in the chip clock, generating a demodulated signal by differential demodulation of the complex baseband signal sampled in the chip clock, providing the derived sequences, calculating correlation results by correlating the demodulated signal with the derived sequences, and deriving, i.e., detecting, the values of the data symbols by evaluating the correlation results. In this case, each derived sequence is assigned to a PN sequence allocable transmit-side and includes derived chips, whose values in each case correspond to a logic linking of particular PN chips of the PN sequence allocable transmit-side that is assigned the derived sequence. The invention relates furthermore to a corresponding receiving unit.

22 Claims, 5 Drawing Sheets

U.S. PATENT DOCUMENTS

| | | | | |
|---|---|---|---|---|
| 6,973,334 | B2 * | 12/2005 | Katagishi et al. | 455/571 |
| 7,471,747 | B2 * | 12/2008 | Heo | 375/343 |
| 7,586,834 | B2 * | 9/2009 | Byun et al. | 370/208 |
| 7,586,982 | B2 * | 9/2009 | Nguyen et al. | 375/233 |
| 2002/0097782 | A1 | 7/2002 | Pajukoski | |
| 2005/0008101 | A1 | 1/2005 | Kazi et al. | |
| 2005/0105596 | A1 * | 5/2005 | Fan et al. | 375/147 |

FOREIGN PATENT DOCUMENTS

| | | |
|---|---|---|
| EP | 0793371 A1 | 9/1997 |

OTHER PUBLICATIONS

Kammeyer, Karl-Dirk: Nachrichtenübertragung [Message Transmission], 3rd ed., 2004, Wiesbaden, Teubner Verlag, ISBN 3-519-26142-1, pp. 330-333 and 369-373.

Office Action and English Translation for Chinese Patent Application 200680019545.0, Jul. 6, 2011.

Summons to Attend Oral Proceedings and English Translation for European Patent Application 06 754 003.9, Oct. 7, 2011.

European Patent Office, EPA EPO DEB Berlin, facsimile to Dr. Andreas Kayser, including English translation generated using Google translator printed on Mar. 5, 2012 (3 pgs).

Caldow et al., "BER Analysis of a Noncoherent Demodulation of Unbalanced DQPSK DSSS," ISSSTA2004, Sydney, Australia, © 2004 IEEE (pp. 280-284).

Macdonald et al., The Performance of Direct-Sequence Spread Spectrum with Complex Processing and Quaternary Data Modulation, IEEE Journal on Selected Areas in Communications, vol. 18, No. 8, © 2000 IEEE (pp. 1408-1417).

Shi et al., "A New Chip-Level Differential Detection System for DS-CDMA," Florida Communication Research Lab, Motorola Labs, © 2002 IEEE (pp. 544-547).

European Patent Office, EPA EPO DEB Berlin regarding EP06754003.9-1525, facsimile to Dr. Andreas Kayser, including English translation generated using Google translator printed on Mar. 5, 2012 (10 pgs).

K. D. Kammeyer, "Nachrichtenübertragung," "Prinzipien der Demodulation," © B.G. Teubner Stuttgart 1996 (pp. 440-441) plus six pages of translation in English.

S. Y. Mui, "DPSK Demodulation with Doppler Compensation," Lockheed Martin Communications Systems, © 1996 IEEE (pp. 1074-1078).

Davis et al., "DPSK vs. Pilot-Aided PSK Map Equalization for Fast-Fading Channels," Centre for Sensor Signal & Information Processing, Dep. of Electrical & Electronic Engineering, Univ. of Melbourne, ©1999 IEEE (pp. 315-320).

* cited by examiner

US 8,223,888 B2

METHOD AND RECEIVING UNIT FOR THE DETECTION OF DATA SYMBOLS

This nonprovisional application is a continuation of International Application No. PCT/EP2006/005175, which was filed on May 31, 2006, and which claims priority to German Patent Application No. DE 102005026091, which was filed in Germany on Jun. 7, 2005, and which are both herein incorporated by reference.

BACKGROUND OF THE INVENTION

1. Field of the Invention

The present invention relates to a method and a receiving unit for the detection of data symbols contained in a received radio signal. The invention relates further to a transmitting/receiving device and to an integrated circuit with a receiving unit of this type.

2. Description of the Background Art

The invention falls within the field of data transmission. Although it can be used in principle in any digital communication system, the present invention and its underlying problem will be explained below with reference to a "ZigBee" communication system in accordance with IEEE 802.15.4.

So-called "Wireless Personal Area Networks" (WPANs) can be used for the wireless transmission of information over relatively short distances (about 10 m). In contrast to "Wireless Local Area Networks" (WLANs), WPANs require little or even no infrastructure for data transmission, so that small, simple, power-efficient, and low-cost devices can be implemented for a wide range of applications.

Standard IEEE 802.15.4 specifies low-rate WPANs, which are suitable with raw data rates up to a maximum of 250 kb/s and stationary or mobile devices for applications in industrial monitoring and control, in sensor networks, in automation, and in the field of computer peripherals and for interactive games. In addition to a very simple and cost-effective implementability of devices, an extremely low power demand of devices is of critical importance for such applications. Thus, an objective of this standard is a battery life of several months to several years.

At the level of the physical layer, in the virtually globally available 2.4 GHz ISM band (industrial, scientific, medical) for raw data rates of fB=250 kbit/s, the IEEE standard 802.15.4 specifies a band spread (spreading) with a chip rate of fC=2 Mchip/s and an offset QPSK modulation (quadrature phase shift keying) with a symbol rate of fS=62.5 ksymbol/s.

In an 802.15.4 transmitter for the ISM band, the data stream to be transmitted is first transformed into a series of PN sequences (pseudo noise) with the use of four data bits in each symbol period (TS=1/fS=16 µs), in order to select a total of 16 PN sequences. Each symbol of four data bits is assigned in this manner a symbol value-specific PN sequence of 32 PN chips (chip period TC=TS/32=500 ns=1 fC), which is transmitted instead of the four data bits. The "quasi-orthogonal" PN sequences P0, P1, . . . , P15, specified in the standard, differ from one another in the cyclic shifts and/or inversion of every second chip value (see IEEE Standard 802.15.4-2003, Chapter 6.5.2.3).

The PN sequences allocated to the successive symbols are linked together and then offset QPSK modulated (quadrature phase shift keying) by modulating, with half-sine pulse shaping, the even-indexed PN chips (0, 2, 4, . . . ) onto the in-phase (I) carrier and the odd-indexed PN chips (1, 3, 5, . . . ) onto the quadrature-phase (Q) carrier. To form an offset, the quadrature-phase chips are delayed by one chip period TC with respect to the in-phase chips (see IEEE Standard 802.15.4-2003, Chapter 6.5.2.4).

Both coherent and incoherent approaches are known to detect data symbols contained in an incoming signal. Whereas in coherent approaches the incoming signal is converted into the complex envelope (baseband) by using a frequency- and phase-correct carrier wave and obtained from the carrier control circuit, in incoherent approaches at least the correctness of the phase, within limits possibly also the correctness of the frequency of the carrier wave, can be eliminated.

A coherent receiving unit is known from the textbook "Nachrichtenübertragung" [Message Transmission] by Karl-Dirk Kammeyer, second edition, B. G. Teubner, Stuttgart, ISBN 3-519-16142-7 (FIG. 12.1.7 on page 417). A disadvantage in this case is the high realization cost, which arises, on the one hand, from the necessary carrier control circuit with the associated high-rate (higher than the chip rate) multiplication of the incoming signal with the frequency- and phase-correct carrier wave and, on the other, from the costly and complex signal processing with a high-rate complex matched filtering. This high realization cost causes in addition a very high power consumption.

A method and system is disclosed in ADLER, Robbie: Adaptive Modulation and the IEEE 802.15.4 standard: Power Performance Tradeoffs, EE359 Project, Fall 2004; a modification of the "physical layers" (PHY) of the 802.15.4 is disclosed to the effect that chip sequences are introduced whose length, i.e., number of chips, changes adaptively.

Furthermore, an incoherent receiving unit is known from the indicated textbook (FIG. 12.3.7 on page 447) and from the third edition of the textbook "Nachrichtenübertragung" [Message Transmission] (Karl-Dirk Kammeyer, Teubner-Verlag, Wiesbaden, ISBN 3-519-26142-1). It has an FM discriminator, an integration unit, and a so-called limiter and requires the processing of high-rate (higher than the chip rate) and in part complex-valued signals.

SUMMARY OF THE INVENTION

It is therefore an object of the present invention to provide a detection method that enables power-saving and simple implementations of transmitting/receiving devices, e.g., according to IEEE 802.15.4, and yet has a high detection efficiency, i.e., a low error rate (symbol, bit, frame error rate, etc.) also in the event of interference effects such as channel distortions and/or noise. It is furthermore the object of the invention to provide a suitable receiving unit, a transmitting/receiving device, and an integrated circuit.

The method of the invention for the incoherent detection of data symbols contained in a received radio signal, whereby each data symbol is allocated transmit-side a symbol value-specific PN sequence of successive PN chips in the chip clock and the PN sequences allocated to the data symbols are offset QPSK modulated, provides that a) the received radio signal is converted (transformed) into a complex baseband signal sampled in the chip clock, b) a demodulated signal is generated by differential demodulation of the complex baseband signal sampled in the chip clock, c) derived sequences are provided, d) correlation results are calculated by correlating the demodulated signal with the derived sequences, and e) the values of the data symbols are derived by evaluating the correlation results (i.e., the data symbols transmitted with the greater probability are detected). In this case, each derived sequence is assigned a PN sequence, allocable transmit-side, and includes derived chips whose values correspond to a logic linking of the particular PN chips to the PN sequence, allocable transmit-side, to which the derived sequence is assigned.

The incoherent receiving unit of the invention comprises a) an internal receiver, configured to convert the received radio signal into a complex baseband signal sampled in the chip clock, b) a differential demodulator, connected to the internal receiver and configured to generate a demodulated signal by differential demodulation of the complex baseband signal sampled in the chip clock, c) a sequence providing unit, configured to provide the previously described derived sequences, d) a correlation unit, connected to the sequence providing unit and the differential demodulator and configured to calculate correlation results by correlating the demodulated signal with the derived sequences, and e) an evaluation unit, connected to the correlation unit and configured to derive the values of the data symbols by evaluating the correlation results.

The transmitting/receiving device of the invention and the integrated circuit of the invention each have this type of receiving unit.

In an embodiment, a baseband signal is provided that is sampled in the chip clock, from the received radio signal and to demodulate it differentially and then to correlate it with derived sequences matched to the differential demodulation. This type of differential demodulation in the chip clock makes possible very simple and power-saving implementations of the receiving unit or the integrated circuit and thereby the transmitting/receiving device, because, on the one hand, no carrier phase control is necessary and, on the other, the entire digital signal processing starting at (incl.) the demodulation does not require rates that are higher than the chip rate. Moreover, the use of derived sequences, which are not identical to the PN sequences usable transmit-side but derived from these, contributes significantly to very simple and power-saving implementations, because the sequence providing, correlation, and evaluation unit can be realized extremely simply in this way.

Such properties are advantageous particularly when—as in applications in industrial monitoring and control, in sensor networks, in automation, or in the field of computer peripherals—an extremely low power requirement and a very simple realizability are essential. Although the invention is not limited to IEEE standard 802.15.4, this is the case by way of example in transmitting/receiving devices for this standard.

The efficiency of the novel receiving unit or the method of the invention is also very high. Thus, the error rate (symbol, bit, frame error rate, etc.) during detection, also in the event of interference effects such as channel distortions and noise, is lower than, e.g., in receiving units with a discriminator and limiter.

In an embodiment of the method of the invention or of the receiving unit of the invention, the demodulated signal has soft information values. As a result, the error rate during detection declines, so that the efficiency of the method of the invention or of the novel receiving unit increases.

A frequency offset is preferably corrected after the actual differential demodulation (i.e., after the multiplication of the undelayed sampling values by the conjugated complex values of the chip clock baseband signal sampling values, delayed in each case by one chip period) by multiplication with a complex factor. In comparison with classic frequency offset correction before the demodulation (in the so-called internal receiver), this reduces further the realization cost and power requirement, because in a higher clock the multiplication is performed not with a "rotating vector" but only with a complex constant in the chip clock. Furthermore, a complete complex multiplication is advantageously not necessary, which would require four real-valued multiplications and two real-valued additions, but only "half" a complex multiplication of two real-valued multiplications and one real-valued addition are needed, because only the imaginary part of the result of the complex multiplication is formed. As a result, the realization cost and power requirement are reduced further.

Preferably, the differential demodulation or the differential demodulator is designed such that no complex multiplications but exclusively real-valued operations are performed. With only two real-valued multiplications and one real-valued addition, this makes possible extremely simple implementations with an extremely low power requirement, when frequency offset correction can be eliminated.

In another embodiment of the method of the invention or the novel receiving unit, the correlation results are calculated in such a way that the demodulated signal in each case (i.e., per symbol period TS) is correlated with a number of (31) chips of the particular derived sequence, which is lower by one than the number of the (32) chips in each of the PN sequences usable transmit-side. By eliminating one chip in the correlation calculation, each data symbol can be advantageously decided (detected) independent of the preceding symbol, which lowers the realization cost further.

According to another embodiment, the demodulated signal is equalized and the correlation results are calculated by correlating the equalized demodulated signal with the derived sequences. Preferably, in this regard, the equalization exhibits a suppression of a direct component. Due to the equalization, the error rate (symbol, bit, frame error rate, etc.) during detection declines, so that the efficiency of the receiving unit of the invention or of the method of the invention increases.

In another embodiment, the derived chips (i.e., the chips of a derived sequence) with a first positive index (i.e., all chips other than the first one) each have a value that can be derived by XORing the PN chip (i.e., the chip of the PN sequence to which the derived sequence is assigned) with said first positive index and the PN chip preceding index-wise (and thereby in time). Preferably, the first chip (with index zero) derived index-wise (and in time) has a value that can be derived by XORing the index-wise first PN chip (with index zero) and the index-wise last PN chip. The sequence providing unit, the correlation unit, and the evaluation unit can be realized very simply with saving of power by the use of derived sequences of this type.

In another embodiment, the derived chips with an even index (0, 2, 4, . . . ) each have a value, assigned to the (logic) value of the particular XOR operation, and the derived chips with an odd index (1, 3, 5) each have a value, assigned to the inverted (logic) value of the particular XOR operation. Preferably, the logic values (0, 1) are allocated antipodal values (+/−1) here, e.g., logic 1 the value +1 and logic 0 the value −1. As a result, the realization of the correlation unit simplifies further, because advantageously only a sign change needs to be performed instead of multiplications with the chip values of the derived chips.

According to an embodiment, the correlation results are evaluated by first determining the index of the correlation result that has the maximum value, and then assigning to this index the data symbol whose symbol value is assigned to the PN sequence, allocable transmit-side, to which the derived sequence with this index is assigned. In this way, the data symbols are reliably detected in a simple manner.

In a further aspect, the correlation results are evaluated in that the maximum correlation value of the correlation result is determined, a constant is added, the resulting sum is multiplied by a factor, and the thus obtained (product) values are limited to a predefined value range. The thus obtained signal quality parameters can be used advantageously by the top layers of the communication system to increase the data transmission reliability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
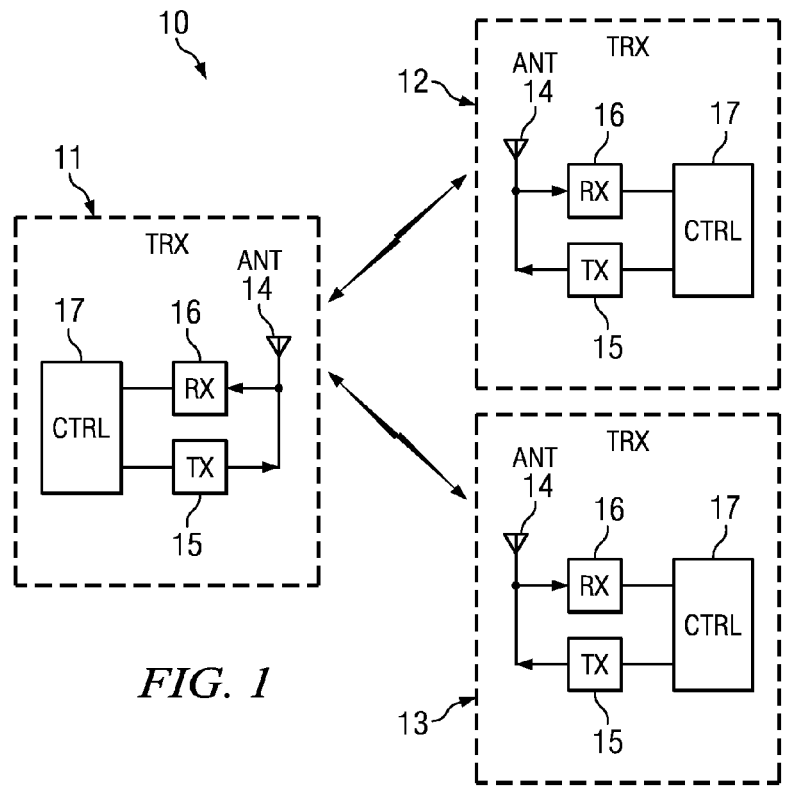
FIG. 1 shows an example of a "Wireless Personal Area Network" (WPAN) according to the IEEE Standard 802.15.4 with transmitting/receiving devices of the invention.

In the figures, the same and functionally identical elements and signals, if not specified otherwise, are provided with the same reference characters.

FIG. 1 shows an example of a "Wireless Personal Area Network" (WPAN) 10 according to IEEE standard 802.15.4. It comprises three transmitting/receiving devices (transceiver, TRX) 11-13 in the form of stationary or mobile devices, which exchange information in a wireless manner by means of radio signals. Transmitting/receiving device 11 is a so-called full-function device, which takes on the function of the WPAN coordinator, whereas transmitting/receiving devices 12, 13 are so-called reduced-function devices, which are assigned to full-function device 11 and can only exchange data with said device. Apart from the star network topology depicted in FIG. 1, in which bidirectional data transmission can occur only between one of the reduced-function devices 12, 13 and full-function device 11, but not between the reduced function devices 12, 13, the standard also provides so-called "peer-to-peer" topologies, in which all full-function devices (of which one assumes the role of the WPAN coordinator) can communicate with all other full-function devices.

Transmitting/receiving devices 11-13 each comprise an antenna 14, a transmitting unit (transmitter, TX) 15 connected to the antenna, a receiving unit (receiver, RX) 16 connected to the antenna, and a control unit (control unit, CTRL) 17, connected to the transmitting and receiving unit, to control transmitting and receiving units 15, 16. Furthermore, transmitting/receiving devices 11-13 each contain a power supply unit, not shown in FIG. 1, in the form of a battery, etc., to supply power to units 15-17, and possibly other components such as sensors, interfaces, etc.

It will be assumed in the following text that the data transmission occurs in the 2.4 GHz ISM band (industrial, scientific, medical). Transmitting unit 15 of each transmitting/receiving device transforms the data stream to be transmitted according to IEEE Standard 802.15.4 into a radio signal to be emitted over its antenna 14 by first converting the data stream to be transmitted, as described in the introduction to the description, into four bit-wide symbols d0, d1, d2, . . . and these into successive PN sequences (e.g., P5, P4, P7, if d0=5, d1=4, d2=7). The successive PN sequences are then offset QPSK modulated (quadrature phase shift keying) with half-sinus pulse formation.

Accordingly, incoherent receiving unit 16 of the invention of each transmitting/receiving device transforms a radio signal, received from its antenna 14 (and generated by the transmitting unit of another transmitting/receiving device according to IEEE Standard 802.15.4), without errors if possible into the transmitted data by inter alia demodulating the radio signal and then detecting (deciding) the data.

Transmitting unit 15 and receiving unit 16 of a transmitting/receiving device are hereby part of an integrated circuit (IC) (not shown in FIG. 1), e.g., an ASICs (application specific integrated circuit), whereas control unit 17 is realized by means of a microcontroller (also not shown). Advantageously, the transmitting/receiving device can also have only one IC (e.g., made as an ASIC), which takes on the functions of transmitting unit 15, receiving unit 16, and control unit 17.

Figure 2:
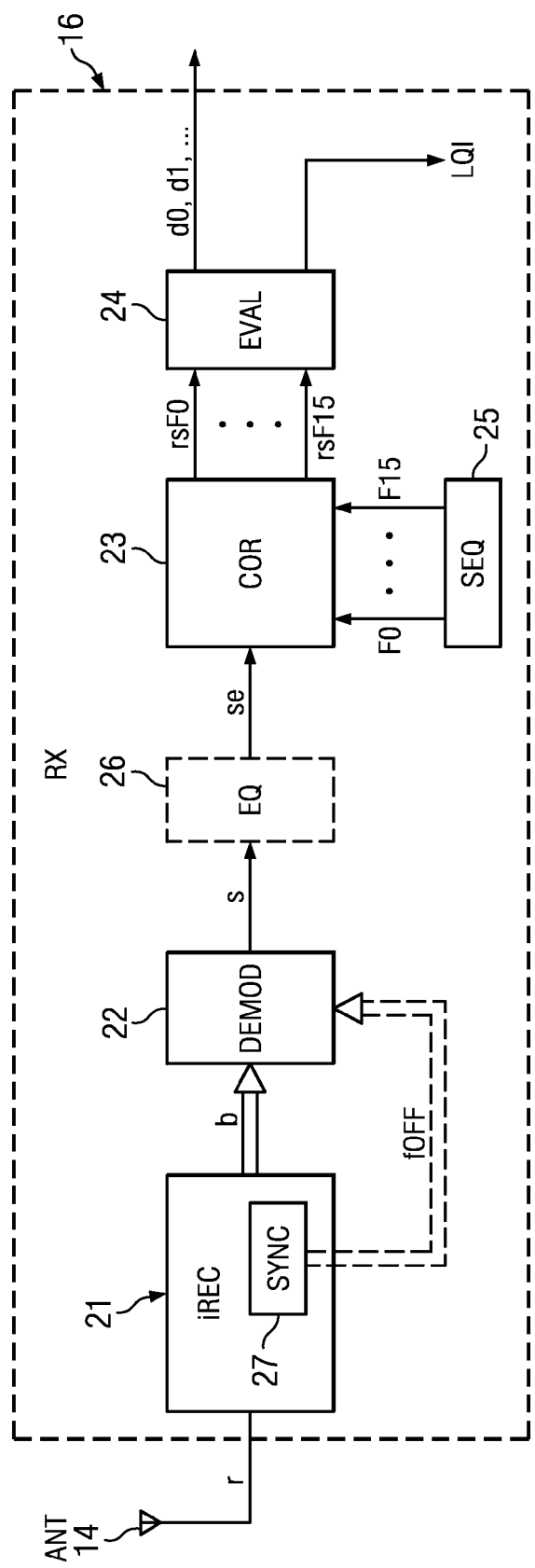
FIG. 2 shows an exemplary embodiment of an incoherent receiving unit (RX) of the invention.

FIG. 2 shows a block diagram of an incoherent receiving unit 16 of the invention, which has the following functional blocks connected in series: an internal receiver (iREC) 21, a differential demodulator (DEMOD) 22, a correlation unit (COR) 23, and an evaluation unit (EVAL) 24. Furthermore, receiving unit 16 has a sequence providing unit (SEQ) 25, connected to correlation unit 23, and optionally an equalizer (EQ) 26 between demodulator 22 and correlation unit 23.

Internal receiver 21, connected to antenna 14 of the transmitting/receiving device, converts the received radio signal r into a complex baseband signal b (envelope), which has complex-valued sampling values in the clock of the PN chips, used transmit-side, of the PN sequences, i.e., in the chip clock $fC=2$ Mchip/s=$1/TC$=½oo ns. Each complex sampling value hereby comprises a real part (in-phase component I) and an imaginary part (quadrature component Q), each of which has a bit width of, e.g., four bits. Depending on the quality of the employed oscillators, the complex baseband signal b can be subjected here to a more or less highly pronounced frequency offset. Complex-valued signals like the baseband signal b are shown in the figures by arrows with double lines.

Internal receiver 21 furthermore has a synchronization unit (SYNC) 27, which performs a symbol and chip clock synchronization and preferably determines a complex factor fOFF necessary for correcting the frequency offset.

The chip clock baseband signal b is then converted by differential demodulator 22 into a demodulated signal s, which has real-valued sampling values in the chip clock. Advantageously, differential demodulator 22 generates a demodulated signal s, whose sampling values have so-called soft information values (higher level sampling values) instead of the so-called hard bits (i.e., two-level binary values). As a result, the efficiency of receiving unit 16 can be improved further. Optionally, differential demodulator 22 can be used advantageously also for correcting a frequency offset. The individual function blocks of differential demodulator 22 and its mode of operation are described in greater detail in regard to FIG. 3.

The demodulated signal s is then optionally equalized. Equalizer 26, provided for this purpose, determines a mean of the demodulated signal s preferably per symbol period TS=1/fS=16 µs=32*TC and releases this signal subsequently by subtracting the mean from a direct component. Alternatively or in addition, equalizer 26 may have a filter, e.g., a high-pass filter.

The demodulated signal s or se, present in chip clock fC and optionally equalized, is then correlated in correlation unit 23 with so-called derived sequences F0, F1, F2, ..., which are provided by sequence providing unit 25 and are explained with reference to the table provided below. This leads to the correlation results rsF0, rsF1, rsF2, ..., which are a measure of the conformity of the signal s or se with the particular derived sequence F0, F1, ..., F15. The correlation results rsF0, rsF1, rsF2, ... are generated in the symbol clock fS=fC/32=62.5 ksymbol/s (corresponds to a symbol period of TS).

Based on the differential demodulation, the detection of a current data symbol requires knowledge of the preceding data symbol. If the correlation results are now calculated in the correlation unit in such a way that the demodulated signal is correlated each time with a number of chips (31) of the particular derived sequence, which is lower by one than the number of chips in each of the PN sequences (32) usable transmit-side, each data symbol can be decided (detected) advantageously independent of the preceding symbol by eliminating one chip in the correlation calculation—without notable losses in the detection efficiency; this reduces further the realization cost for the receiving unit.

The correlation results rsF0, rsF1, ... are finally evaluated in evaluation unit (EVAL) 24 and the data symbols d0, d1, ... are detected. Furthermore, evaluation unit 24 preferably calculates a quality parameter (link quality indication, LQI), which indicates the quality of the communication link. Evaluation unit 24 will be described in greater detail in regard to FIG. 4.

Figure 3A:
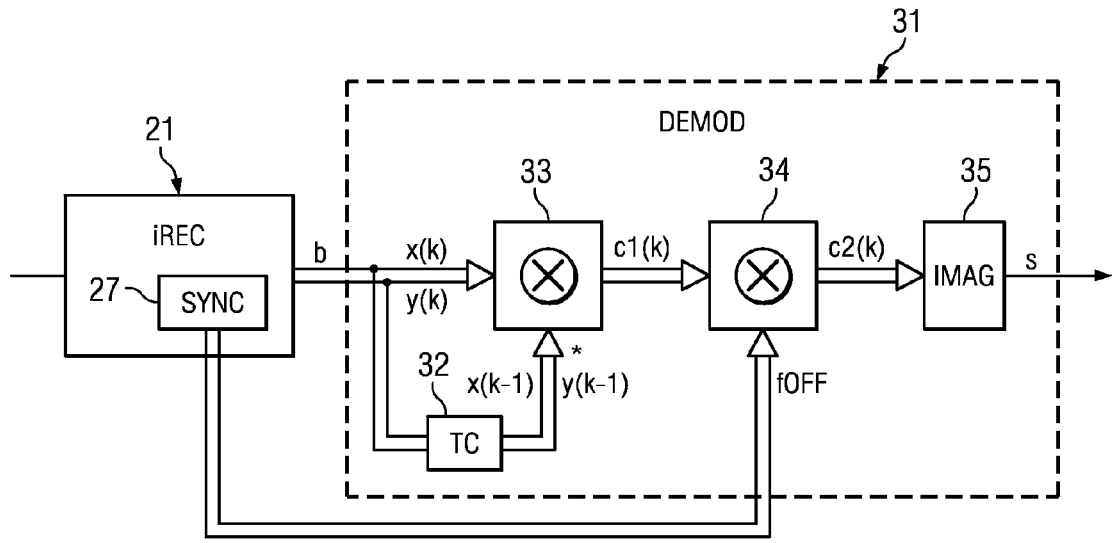
FIG. 3 shows realization examples of differential demodulator 22 of the incoherent receiving unit of the invention according to FIG. 2.
Figure 3B:
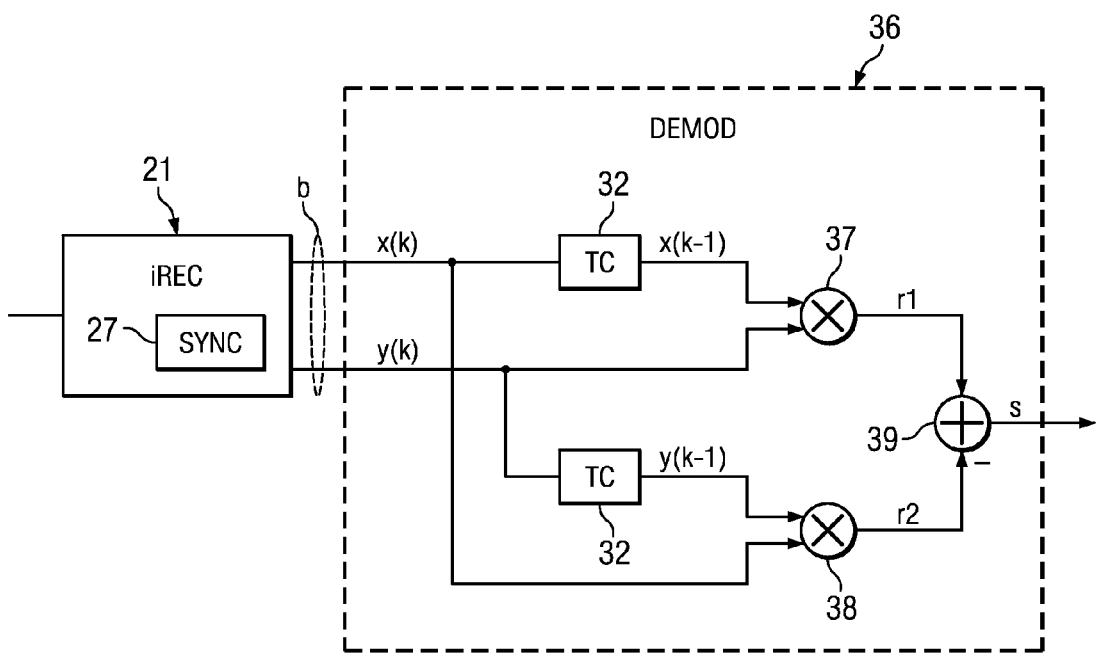

FIG. 3 shows two block diagrams of different realization forms of differential demodulator (DEMOD) 22 shown in FIG. 2. The more complex realization form according to FIG. 3a is to be provided advantageously in cases in which a frequency offset is to be corrected, whereas the simpler realization form according to FIG. 3b is advantageous when compensation of the frequency offset is not necessary and/or not desired. The input signal in both cases is the complex baseband signal b, provided by internal receiver 21 from FIG. 2, with the sampling values in the chip clock fC=2 Mchip/s.

Differential demodulator 31, shown in FIG. 3a, comprises a delay unit 32 connected to internal receiver 21, a first complex multiplication unit 33 connected to internal receiver 21 and to delay unit 32, a second complex multiplication unit 34 connected to first complex multiplication unit 33 and to internal receiver 21, and an imaginary part forming unit 35 connected to second complex multiplication unit 34.

Delay unit 32 is configured to provide at the output the sampling values of two real input signals, which can be interpreted as a real part (I) and imaginary part (Q) of a complex input signal, each time with a delay by one chip period TC=1/fC=500 ns. Complex multiplication units 33, 34 perform complex multiplications; first multiplication unit 33 multiplies the complex sampling values applied at the first input by the conjugated complex values of the complex sampling values applied at the second input, whereas second multiplication unit 34 multiplies the applied complex sampling values "directly" by one another. Imaginary part forming unit 35 finally suppresses the real part of the complex input variable and provides the imaginary part of the input variable at the output.

For the following description of the mode of operation of differential demodulator 31, the sampling values of the complex baseband signal b are designated by $x(k)+j*y(k)$ (see FIG. 3a), where $x(k)$ represents the real part (in-phase component I) and $y(k)$ the imaginary part (quadrature component Q) of the sampling values and k provides a time index (index of the chip periods).

First complex multiplication unit 33 multiplies the current sampling values $x(k)+j*y(k)$ by the conjugated complex values $x(k-1)j*y(k-1)$ of the sampling values $x(k-1)+j*y(k-1)$ delayed by one chip period TC:

$$c1(k)=(x(k)+j*y(k))*(x(k-1)j*y(k-1)). \qquad (1a)$$

The thus obtained first complex products $c1(k)$ are then multiplied in second complex multiplication unit 34 by the complex factor fOFF provided by internal receiver 21, to compensate for the frequency offset and to calculate the second complex products $c2(k)$:

$$c2(k)=c1(k)*fOFF. \qquad (2a)$$

The imaginary part of these second complex products $c2(k)$ is finally formed in imaginary part forming unit 35 and the demodulated signal $s(k)$ is provided:

$$s(k)=\text{Imag}\{c2(k)\}. \qquad (3a)$$

The realization form of the differential demodulator as shown in FIG. 3a can be simplified by replacing function blocks 34, 35 with a unit that calculates only the imaginary part of the product of $c1(k)$ and fOFF:

$$s(k)=\text{Real}\{c1(k)\}*\text{Imag}\{fOFF\}+ \text{Imag}\{c1(k)\}*\text{Real}\{fOFF\}. \qquad (2a'\text{-}3a')$$

According to equation (2a'-3a'), this unit contains only two multipliers with two inputs each for the real-valued multiplication of $\text{Real}\{c1(k)\}$ by $\text{Imag}\{fOFF\}$ or $\text{Imag}\{c1(k)\}$ by $\text{Real}\{fOFF\}$ and an adder, connected downstream, for the addition of the real-value multiplication results.

The differential demodulator is simplified further when the frequency offset correction is eliminated. The very simple realization form, advantageous in this case, is shown in FIG. 3b.

Differential demodulator 36, shown in FIG. 3b, comprises a delay unit 32 connected to internal receiver 21, two multipliers 37, 38 each connected to internal receiver 21 and to delay unit 32, and a first adder 39 connected to the multipliers.

Whereas delay unit 32 in FIGS. 3a and 3b are made identically, multipliers 37, 38, in contrast to complex multiplier units 33, 34 in FIG. 3a, are real multipliers for multiplying real-valued sampling values.

The mode of operation of differential demodulator 36 can be described as follows with the designation introduced heretofore for the sampling values of the complex baseband signal b (see FIG. 3b). First multiplier 37 multiplies the imaginary parts $y(k)$ of the current sampling values $x(k)+j*y(k)$ of the complex baseband signal b by the real parts $x(k-1)$ of the sampling values $x(k-1)+j*y(k-1)$, delayed by one chip period, and thus calculates the first (real-valued) products $$r1(k)=y(k)*x(k-1). \qquad (1b)$$

By analogy, second multiplier 38 multiplies the real parts $x(k)$ of the current sampling values $x(k)+j*y(k)$ of the complex baseband signal b by the imaginary parts $y(k-1)$ of the sampling values x(k−1)+j*y(k−1), delayed by one chip period, and thus calculates the second (real-valued) products $$r2(k)=x(k)*y(k-1). \quad (2b)$$

Finally, first adder 39 forms the following difference between the first and second products and provides the demodulated signal s(k):

$$s(k)=r1(k)-r2(k). \quad (3b)$$

As can be seen from FIGS. 3a and 3b, hard decisions are not made in either of the two realization forms 31, 36 of differential demodulator 22. Hard decisions of this type would have the result that the sampling values of the demodulated signal s in each case could assume only two values, such as, e.g., the binary values zero and one, and the demodulated signal s thereby would have hard bits. In contrast, the demodulated signal s in each of the realization forms according to FIG. 3a or 3b have higher level (more than two-level) sampling values, which are also called "soft information values." In comparison with a hard decided demodulated signal of hard bits, more information is made available to the following blocks (equalizer 26, correlation unit 23, and evaluation unit 24, see FIG. 2) with the demodulated signal s, having soft information values, according to FIG. 3a or 3b, and the efficiency of the entire receiving unit 16, i.e., for example, the bit, symbol, frame error rate, etc., is improved in the event of interference effects such as channel distortions and noise. Simulations by the applicant have shown that the efficiency of the receiver for AWGN channels (additive white Gaussian noise) improves by about 2 dB when the demodulated signal has 4 bit-wide soft information values instead of hard bits.

It will be described hereinafter how the derived sequences F0, F1, provided by sequence providing unit 25 according to FIG. 2, are obtained. The following table shows both PN sequences P0, P1, . . . , P15 to be used transmitter-side according to IEEE 802.15.4 and also the derived sequences F0, F1, . . . , F15 assigned to the PN sequences of the invention.

In regard to the PN sequences P0, P1, P2, . . . to be used transmit-side, it must be determined first that a sequence set with a total of 16 PN sequences P0, P1, . . . P15 is specified. Each PN sequence in this case comprises 32 so-called chips, each of which can assume a value of logic zero (0) or one (1). As is evident from the table, e.g., the first 10 chips of the PN sequence P5 assume the values 0 0 1 1 0 1 0 1 0 0.

For the chips, e.g., of the PN sequence P5, the parameters P5c0 (first chip (c0) of P5), P5c1 (second chip (c1)), . . . , P5c30, P5c31 (last chip (c31)) are introduced to simplify the description. This also applies to the other PN sequences, so that Picj designates the chip with index j (i.e., the (j+1)-th chip) of the PN sequence with index i (Pi), where i=0, 1, . . . , 15 and j=0, 1, . . . , 31. Furthermore, to better differentiate the chips of the PN sequences from those of the derived sequences, the former are designated as PN chips.

```
Pi: PN sequence i (transmit-side) (Pic0 Pic1 Pic2 Pic3 . . . Pic30 Pic31)
Fi: sequence derived from Pi (Fic0 Fic1 Fic2 Fic3 . . . Fic30 Fic31)
P0:  1 1 0 1 1 0 0 1 1 1 0 0 0 0 1 1 0 1 0 1 0 0 1 0 0 0 1 0 1 1 1 0
F0:  + + + - - - - - + + + - + + + + - + - + + + - - + + - + + - -

P1:  1 1 1 0 1 1 0 1 1 0 0 1 1 1 0 0 0 0 1 1 0 1 0 1 0 0 1 0 0 0 1 0
F1:  + + - - + + + - - - - - + + + - + + + - + - + + + - - + + -

P2:  0 0 1 0 1 1 1 0 1 1 0 1 1 0 0 1 1 1 0 0 0 0 1 1 0 1 0 1 0 0 1 0
F2:  - + + - + + - - + + + - - - - - + + + - + + + + - + - + + + -

P3:  0 0 1 0 0 0 1 0 1 1 1 0 1 1 0 1 1 0 0 1 1 1 0 0 0 0 1 1 0 1 0 1
F3:  + + + - - + + - + + - - + + + - - - - - + + + - + + + + - + -

P4:  0 1 0 1 0 0 1 0 0 0 1 0 1 1 1 0 1 1 0 1 1 0 0 1 1 1 0 0 0 0 1 1
F4:  + - + - + + + - - + + - + + - - + + + - - - - - + + + - + + +

P5:  0 0 1 1 0 1 0 1 0 0 1 0 0 0 1 0 1 1 1 0 1 1 0 1 1 0 0 1 1 1 0 0
F5:  - + + + - + - + + + - - + + - + + - - + + + - - - - - + + +

P6:  1 1 0 0 0 0 1 1 0 1 0 1 0 0 1 0 0 0 1 0 1 1 1 0 1 1 0 1 1 0 0 1
F6:  - + + + - + + + - + - + + - - + + - + + - + + + - - - - -

P7:  1 0 0 1 1 1 0 0 0 0 1 1 0 1 0 1 0 0 1 0 0 0 1 0 1 1 1 0 1 1 0 1
F7:  - - - - + + + - + + + + - + - + + - - + + - + + - - + + + -

P8:  1 0 0 0 1 1 0 0 1 0 0 1 0 1 1 0 0 0 0 0 1 1 1 0 1 1 1 1 0 1 1
F8:  - - - + + + + + - - - + - - - + - + - - - + + - + - - + +

P9:  1 0 1 1 1 0 0 0 1 1 0 0 1 0 0 1 0 1 1 0 0 0 0 0 1 1 1 0 1 1 1
F9:  - - + + - - - + + + + + - - - + - - - - + - + - - - + + - - +

P10: 0 1 1 1 1 0 1 1 1 0 0 0 1 1 0 0 1 0 0 1 0 1 1 0 0 0 0 0 0 1 1 1
F10: + - - + - - + + - - - + + + + + - - + - - - - - + + - - - +

P11: 0 1 1 1 0 1 1 1 1 0 1 1 1 0 0 0 1 1 0 0 1 0 0 1 0 1 1 0 0 0 0 0
F11: - - - + + - - + - - + + - - - + + + + + - - - + - - - - + - +

P12: 0 0 0 0 0 1 1 1 0 1 1 1 1 0 1 1 1 0 0 0 1 1 0 0 1 0 0 1 0 1 1 0
F12: - + - + - - - + + - - + - - + + - - - + + + + + - - - + - - -

P13: 0 1 1 0 0 0 0 0 0 1 1 1 0 1 1 1 1 0 1 1 1 0 0 0 1 1 0 0 1 0 0 1
F13: + - - - - + - + - - + + - - + - - + + - - - + + + + + - - -
```

```
-continued
P14: 1 0 0 1 0 1 1 0 0 0 0 0 0 1 1 1 0 1 1 1 1 0 1 1 1 0 0 0 1 1 0 0
F14: + - - - + - - - - + - + - - - + + - - - + - - + + - - - - + + + +

P15: 1 1 0 0 1 0 0 1 0 1 1 0 0 0 0 0 0 1 1 1 0 1 1 1 1 0 1 1 1 0 0 0
F15: + + + + - - - + - - - - + - + - - - + + - - + - - + + - - - - +
```

If the 16 PN sequences are divided into a first group PG8 of 8 PN sequences P0, P1, ..., P7 and a second group of 8 PN sequences P8, P9, ..., P15, it is evident further from the table that the first PN sequences in the first group differ from one another only in a cyclic shift of their chip values. Thus, e.g., the bit pattern {1 1 0 1 1 0}, occurring at the start of the PN sequence P0, can be seen—in a cyclic expansion—in the PN sequence P1 starting at PN chip P1$c$4, in the PN sequence P2 starting at P2$c$8, in P3 starting at P3$c$12, in P4 starting at P4$c$16, ..., and finally in P7 starting at P7$c$28. The PN sequences in the second group also differ from one another only in a cyclic shift of their chip values.

It can be determined further that for each PN sequence in the first group there is a PN sequence in the second group that differs from said first PN sequence in the first group only in every second chip value—namely, by an inversion of every second chip value. If, e.g., the PN sequences P0 and P8 in the table are compared, it is found that the even-indexed PN chips have identical values (P0$c$0=P8$c$0=1; P0$c$2=P8$c$2=0; P0$c$4=P8$c$4=1; etc.), whereas the odd-indexed PN chips assume different values (P0$c$1=1, P8$c$1=0, P0$c$3=1, P8$c$3=0; P0$c$5=0, P8$c$5=1, etc.).

Each PN sequence according to the invention is assigned a nonidentical derived sequence, matched to the differential demodulation, for example, the derived sequence F0, listed in the table below P0, to PN sequence P0, the derived sequence F1 to PN sequence P1, etc. The chips of the derived sequences, here designated as derived chips, can assume the antipodal values +1 and −1; for reasons of clarity, only the sign of these values is entered in the table. In analogy to the designation for the PN chips introduced above, the derived chip with index j of the derived sequence with index is designated hereinafter by Ficj, where i=0, 1, ..., 15 and j=0, 1, ..., 31.

The values of the derived chips result as follows from the values of the PN chips. In order to form, e.g., the value of the derived chip F0$c$2, which is +1 according to the table, the value of the PN chip P0$c$2=0, entered directly above in the table, is to be logically XORed with the value of the PN chip P0$c$1=1, entered to the left (i.e., preceding in time) of P0$c$2. The logic XORing in this case produces a value of logic 1, which is assigned the antipodal value +1 entered in the table for F0$c$2. Accordingly, the value of F0$c$4 from P0$c$4 XOR P0$c$3=1 XOR 1=0 results as the value of −1 entered in the table for F0$c$4, because the logic zero is assigned an antipodal value of −1. This derivation rule applies to all derived chips with a positive even index. If, therefore, Ficj designates the derived chip with the index j of the derived sequence with the index i and Picj and Picn the PN chip with the index j or n, respectively, of the PN sequence with the index i, for positive even indexes j the derived chip Ficj for i=0, 1, ..., 15 results as $$Ficj = 2*(Picj \text{ XOR } Picn) - 1 \text{ with } n = j-1 \text{ for } j = 2, 4, 6, \ldots, 30; \quad (4)$$

whereby the multiplication of the result of the XORing with the factor 2 and the subsequent subtraction of 1 are to reflect the assignment of the logic values of 0 and 1 to the antipodal values −1 or +1.

To form the derived chips Ficj with the index j=0, the last PN chip Picn with n=31 is to be used instead of the (nonexistent) PN chip Picn, preceding in time, with the index n=j−1=−1, i.e., $$Ficj = 2*(Picj \text{ XOR } Picn) - 1 \text{ with } j = 0 \text{ and } n = 31 \text{ for } i = 0, 1, \ldots, 15. \quad (5)$$

A derivation rule similar to equation (4) applies to the derived chips Ficj with the odd index j. In this case, the XORing result is to be inverted before the assignment to antipodal values:

$$Ficj = 2*\text{INV}\{Picj \text{ XOR } Picn\} - 1 \text{ with } n = j-1 \text{ for } j = 1, 3, 5, \ldots, 31, \quad (6)$$

where INV{ } designates the logical inversion and i=0, 1, ..., 15 again applies.

Instead of the inversion of logic values with subsequent assignment of logic 0 to the antipodal value −1 and of logic 1 to the antipodal value +1, naturally also a different assignment can be used, namely of logic 0 to the antipodal value +1 and of logic 1 to the antipodal value −1, and therefore the logical inversion can be eliminated. The following then results as the formula $$Ficj = 1 - 2*(Picj \text{ XOR } Picn) \text{ with } n = j-1 \text{ for } j = 1, 3, 5, \ldots, 31. \quad (6')$$

The use of the PN chip "current" in each case (with the index of the derived chip to be formed) and of the PN chip, preceding in each case, corresponds, as described in the introduction to the description, to the transmit-side division of the even-(odd-)indexed PN chips on the in-phase-(I) carrier (quadrature-phase (Q) carrier) within the scope of the offset QPSK modulation (quadrature phase shift keying). Other transmit-side I/Q separations of the PN chips require an appropriately matched formation of the derived chips.

If the 16 derived sequences are divided into a first group of 8 derived sequences F0, F1, ..., F7 and a second group of 8 derived sequences F8, F9, ..., F15, it is evident from the table that the derived sequences in the first group differ from one another only in a cyclic shift of their chip values. Thus, e.g., the bit pattern {+ + + − − −}, occurring at the start of the derived sequence F0, can be seen—in a cyclic expansion—in the derived sequence F1 starting at derived chip F1$c$4, in the derived sequence F2 starting at F2$c$8, in F3 starting at F3$c$12, in F4 starting at F4$c$16, ..., and finally in F7 starting at F7$c$28. The derived sequences in the second group also differ from one another only in a cyclic shift of their chip values.

It is to be established further that for each derived sequence in the first group there is a derived sequence in the second group that differs only in an inversion of all of its chip values. If, e.g., the derived sequences F0 and F8 are compared in the table, it is found that all chip values are inverted. Because this also applies to the sequence pairs F1/F9, F2/F10, etc., it can be stated that all derived sequences in the first group are contained in inverted form in the second group:

$$Ficj = (-1)*Fncj \text{ with } i = 0, 1, \ldots, 7, n = i+8 \text{ and } j = 0, 1, \ldots, 31. \quad (7)$$

In contrast to the PN sequences in which the corresponding sequence pairs (P0/P8, P1/P9, etc.) differ in an inversion of each second PN chip, the corresponding pairs of derived sequences differ in an inversion of all of their chip values.

The properties, indicated in the previous paragraphs, for the derived sequences enable very simple realizations of sequence providing unit 25, correlation unit 23, and evaluation unit 24, and thereby the entire receiving unit 16 in FIG. 2.

It is apparent that the inverted sequences in each case can also be used instead of the derived sequences listed in the table. This corresponds only to an interchanged assignment between the PN sequences and the derived sequences. Thus, in this case, the derived sequence F8 from the table is assigned to PN sequence P0, the derived sequence F9 from the table to PN sequence P1, etc. This interchanged assignment is to be taken into account accordingly in the correlation and/or evaluation unit.

In correlation unit 23, the first chip of the derived sequences (Fic0) advantageously continues not to be considered in each case during the calculation of the correlation results, so that in evaluation unit 24 the data symbols can be decided independent of the specifically preceding data symbol. The receiving unit can thus be realized more simply without notable losses in detection efficiency.

Figure 4:
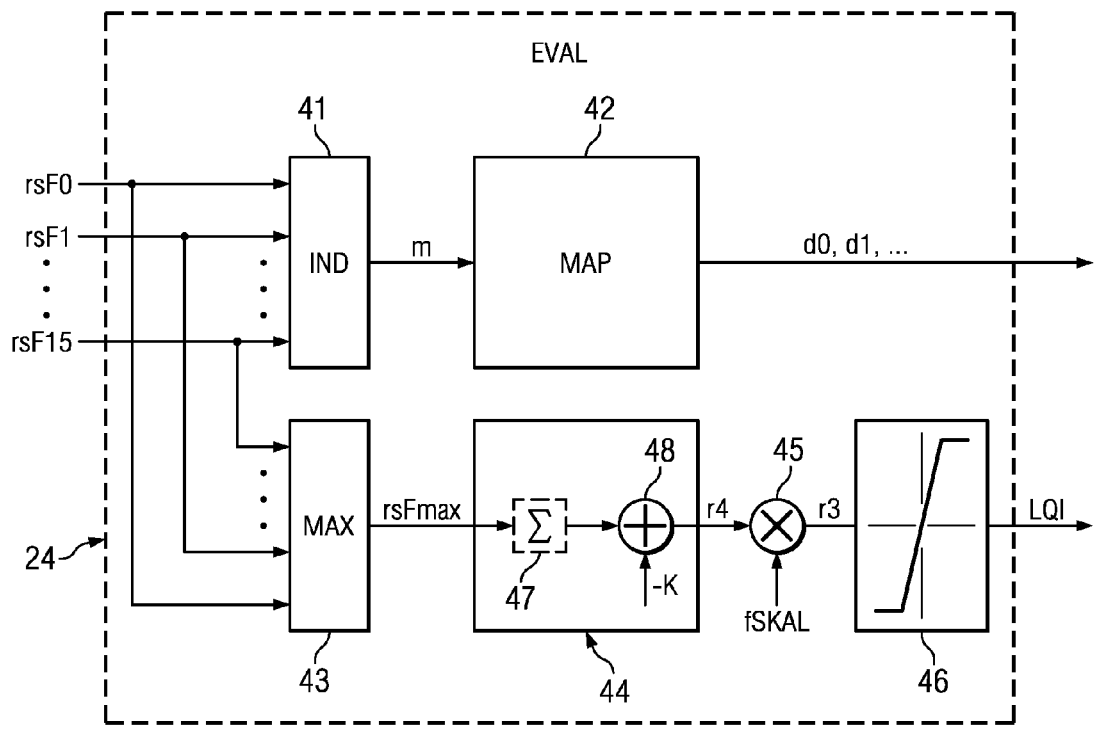
FIG. 4 shows a realization example of evaluation unit 24 of the incoherent receiving unit of the invention according to FIG. 2.

FIG. 4 shows a block diagram of evaluation unit (EVAL) 24 from FIG. 2, which has an index determining unit 41 connected to correlation unit 23, and allocation unit 42 connected to said index determining unit, and preferably an LQI unit 43-46 (link quality indication) connected to correlation unit 23. The LQI unit has the following function blocks connected in series: a maximum forming unit 43 connected to correlation unit 23, an addition unit 44, a third multiplier 45, and a value limiting unit 46.

The correlation results rsF0, rsF1, . . . , rsF15, calculated by correlation unit 23, are evaluated in index determining unit 41 by determining the index of the correlation result that has the maximum value of all correlation results rsF0, rsF1, . . . , rsF15, per symbol period TS and outputting it as the value of the index m according to FIG. 4. If, for example, the correlation result rsF5 has the maximum value of all correlation results, index determining unit 41 outputs the value m=5. This means that the signal s or se with the derived sequence F5 has the highest degree of conformity among all derived sequences F0, F1, . . . , F15.

Allocation unit 42 assigns to each index m the symbol value that is assigned the PN sequence assigned to the derived sequence with this index m. With the assumption that the PN sequence P5 is assigned to the symbol value d=5 transmit-side and in conformity with the above table the derived sequence F5 is assigned in turn to said sequence, allocation unit 42 in the above example therefore allocates the data symbol d=5 to the index m=5.

Maximum forming unit 43 of the LQI unit determines the maximum correlation value rsFmax of all correlation results rsF0, rsF1, . . . , rsF15 per symbol period TS. Addition unit 44 optionally has an integration unit 47, but in each case a second adder 48, whereby integration unit 47 adds or averages several maximum correlation values rsFmax, preferably determined in successive symbol periods, and second adder 48 adds a constant −K or subtracts the value +K, in order to calculate the sum r4 in this way. Third multiplier 45 then multiplies the sum r4 by the factor fSKAL, before value limiting unit 46 limits the thus obtained third products r3 to a predefined value range (e.g., 0 . . . 255), to provide an LQI value as a measure of the quality of the communication link. The constant −K and the factor fSKAL are selected here in such a way that the signal quality (LQI), provided after the above steps, depending on the quality of the received radio signal r, completely covers the predefined value range (e.g., 0 . . . 255).

The receiving unit of the invention, previously described with reference to FIGS. 2 to 4, and thereby also transmitting/receiving devices that have this type of receiving unit are notable for a very simple realizability, an extremely low power requirement, and a high efficiency (bit error rate or the like depending on interference effects such as noise and/or channel distortions). According to tests performed by the applicant, the digital parts of the receiving units of the invention—without a synchronization unit—require a hardware cost on the order of a few thousand gate equivalents (NAND gates with two inputs). In the data transmission mode, these digital parts of the receiving units of the invention have a power requirement on the order of a few milliwatts (mW).

Figure 5:
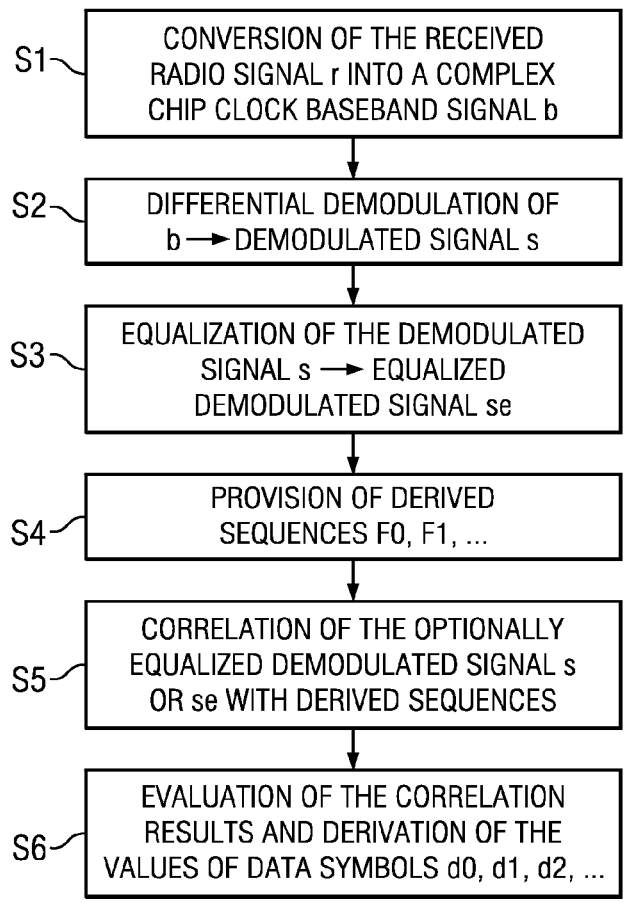
FIG. 5 shows an exemplary embodiment of a method of the invention for incoherent detection.

FIG. 5 shows a flowchart of the novel method for incoherent detection. In step S1, first the received radio signal r is converted into a complex baseband signal b with sampling values in the chip clock fC. In step S2, the complex baseband signal b is demodulated differentially. In optional step S3, the demodulated signal s is equalized and thus an equalized demodulated signal se is formed. In step S4, which alternatively can also be performed before step S3—in the extreme case even before step S1—, the derived sequences F0, F1, F2, . . . , described in greater detail above, are provided. In step S5, the demodulated signal s or the equalized demodulated signal se is correlated with the derived sequences F0, F1, F2, . . . to calculate the correlation results rsF0, rsF1, rsF2, . . . . Finally, the correlation results are evaluated in step S6 and the values of the data symbols d0, d1, d2, . . . are derived. A more detailed description of steps S1-S6 can be obtained from the previous description of the mode of action of receiving unit 16 or its function blocks 21-26 with reference to FIGS. 1 and 2.

Figure 6A:
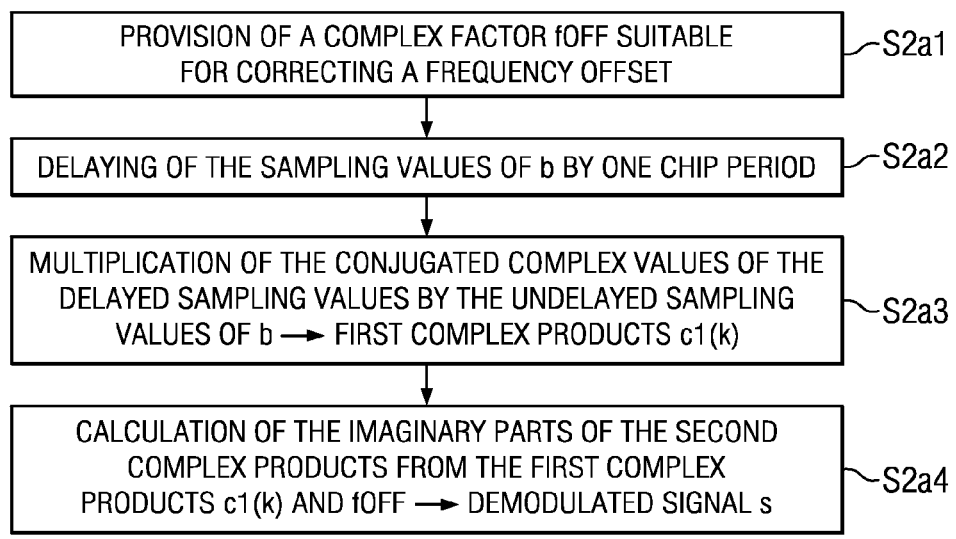
FIG. 6 shows realization examples of differential demodulation step S2 of the method of the invention according to FIG. 5.
Figure 6B:
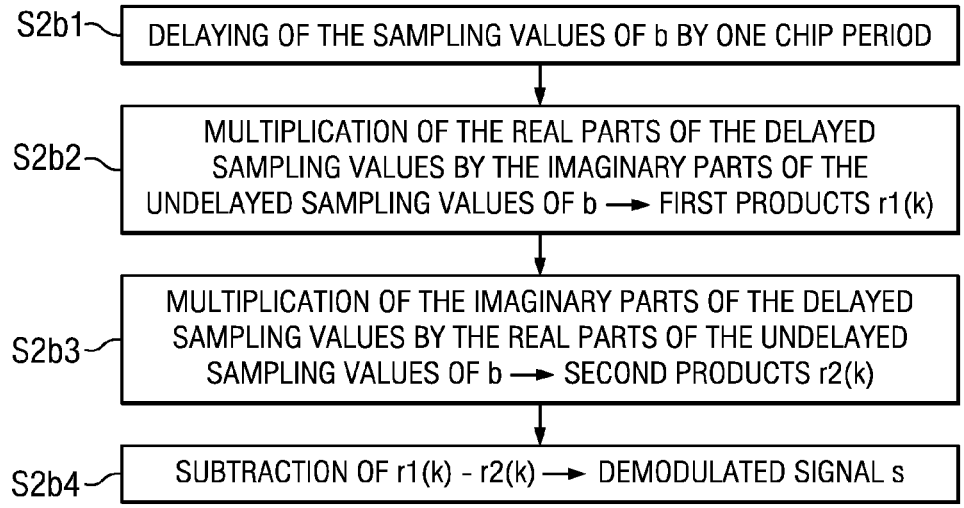

FIG. 6 shows two flowcharts of different realization forms of the differential demodulation step S2 from FIG. 5. The first realization form according to FIG. 6a is to be provided advantageously in cases in which a frequency offset is to be corrected, whereas the second realization form according to FIG. 6b is advantageous when compensation of the frequency offset is not to occur.

According to FIG. 6a, in step S2a1, a complex factor fOFF suitable for correcting frequency offset is determined. This step occurs as part of step S1 in FIG. 5 (provision of b), but can also occur as part of step S2 (but before step S2a4). In step S2a2, the sampling values x(k)+jy(k) of the complex chip clock baseband signal b are delayed by one chip period TC. In step S2a3, first complex products c1(k) are calculated by multiplying the conjugated complex values of the sampling values x(k−1)−jy(k−1), delayed according to step S2a2, by the undelayed sampling values x(k)+jy(k) of the complex baseband signal b. Finally, in step S2a4, the demodulated signal s is formed by calculating (only the) imaginary parts of second complex products c2(k) from the first complex products c1(k) [S2a3] and the complex factor fOFF [S2a1]. A more detailed description of steps S2a1-S2a4 can be obtained from the above description of the mode of action of differential demodulator 22, 31 or its function blocks 32-35 with reference to FIGS. 2 and 3a and equations (1a) to (2a'-3a').

According to FIG. 6b, in step S2b1, the sampling values x(k)+jy(k) of the complex chip clock baseband signal b, similar to step S2a2 in FIG. 6a, are delayed by one chip period TC. In step S2b2, first products r1(k) are calculated by multiplying the real parts of the delayed sampling values x(k−1) by the imaginary parts of the undelayed sampling values y(k) of the complex baseband signal b. In step S2b3, second products r2(k) are calculated by multiplying the imaginary parts of the delayed sampling values y(k−1) by the real parts of the undelayed sampling values x(k) of the complex baseband signal b.

Finally, in step S2b4, the demodulated signal s is formed by subtracting the second products r2(k) from the first products r1(k). A more detailed description of steps S2b1-S2b4 can be obtained from the above description of the mode of action of differential demodulator 22, 36 or its function blocks 32, 37-39 with reference to FIGS. 2 and 3b and equations (1b) to (3b).

Both the generated demodulated signal according to FIG. 6a and FIG. 6b advantageously has soft information values (cf. description of FIG. 3).

Figure 7A:
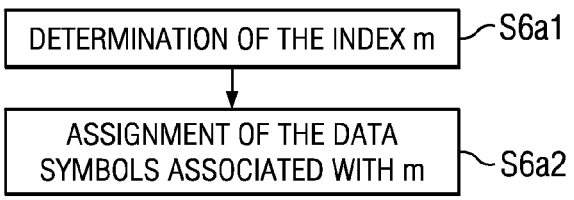
FIG. 7 shows a realization example of evaluation step S6 of the method of the invention according to FIG. 5.

FIG. 7a shows a flowchart of evaluation step S6 in FIG. 5. In step S6a1, the index m is determined for the correlation result that has the maximum value, e.g., therefore m=5, if rsF5 has the maximum value of all correlation results rsF0, rsF1, rsF2, . . . . In step S6a2, this index m is assigned the data symbol whose symbol value is assigned to the PN sequence, allocable transmit-side, that is assigned the derived sequence with this index m. If in the above example, e.g., the PN sequence P5 is assigned to the symbol value d=5 and the derived sequence F5 is assigned in turn to said sequence, the data symbol with the symbol value d=5 is assigned to the index m=5.

Figure 7B:
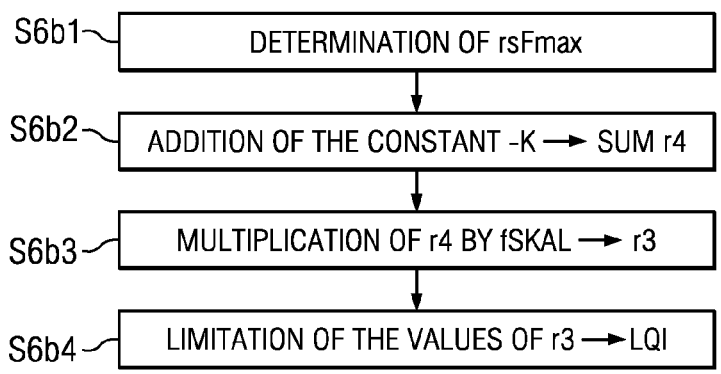

FIG. 7b shows another flowchart of the evaluation step S6 in FIG. 5, in which the signal quality is determined. In step S6b1, for this purpose, first the maximum value rsFmax of all correlation results rsF0, rsF1, rsF2, . . . is determined per symbol period TS. After optionally (not shown in FIG. 7b) several values rsFmax, belonging to successive symbol periods, are added (accumulated, integrated), in step S6b2 the sum r4 is calculated by adding a constant −K, and the sum is multiplied in step S6b3 by the factor fSKAL, to thus calculate a third product r3. The signal quality parameter LQI (link quality indication) is finally determined in step S6b4 in which the values of the third product r3 are limited to a predefined value range such as, e.g., 0 . . . 255. The constant −K and the factor fSKAL are selected here in such a way that the signal quality (LQI), depending on the quality of the received radio signal r, completely covers the predefined value range.

A more detailed description of the steps shown in FIGS. 7a and 7b can be obtained from the above description of the mode of action of evaluation unit 24 or its function blocks 41-48 with reference to FIGS. 2 and 4.

Although the present invention was described above with reference to exemplary embodiments, it is not limited thereto but can be modified in many ways. Thus, the invention is not limited either to WPANs according to IEEE 802.15.4 or to the PN sequences specified therein (number and length of the sequences, number of levels and values of the chips, etc.), rates and number of levels of the chips/symbols/bits, etc. The invention is also not limited to the derived sequences given in the above table. Various equivalent logic relationships can be given for the relationship between the derived chips and the PN chips.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
receiving a radio signal comprising at least one data symbol, the at least one data symbol allocated at a transmit side with one or more pseudo-noise (PN) sequences, the one or more PN sequences being offset quadrature phase shift keying (QPSK) modulated;
converting the received radio signal into a complex baseband signal sampled in a chip clock;
generating a demodulated signal by differential demodulation of the complex baseband signal sampled in the chip clock;
providing one or more derived sequences, each derived sequence assigned to a particular PN sequence of the one or more PN sequences and including at least one derived chip with a first positive index, the at least one derived chip with the first positive index having a value derived by exclusive ORing (XORing) a PN chip with the first positive index and an index-wise preceding PN chip;
calculating correlation results measuring conformity of the demodulated signal to each of the one or more derived sequences by correlating the demodulated signal with each of the one or more derived sequences; and
deriving the values of the at least one data symbol using a selected one of the one or more derived sequences with a highest degree of conformity to the demodulated signal determined by evaluating the correlation results.

2. The method according to claim 1, wherein the demodulated signal has soft information values.

3. The method according to claim 2, wherein the generation of the demodulated signal comprises:
delaying the sampling values of the complex baseband signal by one chip period;
calculating first complex products by multiplying conjugated complex values of the delayed sampling values by the undelayed sampling values of the complex baseband signal; and
generating the demodulated signal by calculating imaginary parts of second complex products from the first complex products and a complex factor suitable for correcting a frequency offset.

4. The method according to claim 2, wherein the generation of the demodulated signal comprises:
delaying the sampling values of the complex baseband signal by one chip period;
calculating first products by multiplying real parts of the delayed sampling values by imaginary parts of the undelayed sampling values of the complex baseband signal;
calculating second products by multiplying the imaginary parts of the delayed sampling values by the real parts of the undelayed sampling values of the complex baseband signal; and
generating the demodulated signal by subtracting the second products from the first products.

5. The method according to claim 1, characterized in that during the calculation of the correlation results, the demodulated signal is correlated in each case with a number of derived chips, which is lower by one than the number of the PN chips contained in each PN sequence.

6. The method according to claim 1, wherein the demodulated signal is equalized, wherein the equalization preferably exhibits a suppression of a direct component, and wherein the correlation results are calculated by correlating the equalized demodulated signal with the derived sequences.

7. The method according to claim 1, wherein an index-wise first derived chip has a value that is derived by XORing an index-wise first PN chip and an index-wise last PN chip.

8. The method according to claim 1, wherein the derived chips with an even index each have a value that is assigned to a respective XOR operation and the derived chips with an odd index each have a value that is assigned to an inverted value of the respective XOR operation.

9. The method according to claim 1, wherein the evaluation of the correlation results comprises:

determining an index of the correlation result that has a maximum value; and assigning to the index of the data symbol whose symbol value is assigned to the PN sequence, allocated at the transmit side, that is assigned the derived sequence with this index.

10. The method according to claim 1, wherein the evaluation of the correlation results comprises:

determining a maximum correlation value of the correlation results;

calculating a sum by adding a constant;

calculating a product by multiplying the sum by a factor; and providing a signal quality by limiting values of the product to a predefined value range;

wherein the constant and the factor are selected in such a way that the provided signal quality, depending on a quality of the received radio signal, completely covers the predefined value range.

11. A receiving unit to comprising:

one or more processors configured to:

receive a radio signal comprising at least one data symbol, the at least one data symbol allocated at a transmit side with one or more pseudo-noise (PN) sequences, the one or more PN sequences offset quadrature phase shift keying (QPSK) modulated;

convert the received radio signal into a complex baseband signal sampled in a chip clock;

generate a demodulated signal by differential demodulation of the complex baseband signal sampled in the chip clock;

provide one or more derived sequences, each derived sequence assigned to a particular PN sequence of the one or more PN sequences and including at least one derived chip with a first positive index, the at least one derived chip with the first positive index having a value derived by exclusive ORing (XORing) a PN chip with the first positive index and an index-wise preceding PN chip;

calculate correlation results measuring conformity of the demodulated signal to each of the one or more derived sequences by correlating the demodulated signal with each of the one or more derived sequences; and derive the values of the at least one data symbol using a selected one of the one or more derived sequences with a highest degree of conformity to the demodulated signal determined by evaluating the correlation results.

12. A receiving unit comprising:

an internal receiver configured to:

receive via an antennae a radio signal comprising at least one data symbol, the at least one data symbol allocated at a transmit side with one or more pseudo-noise (PN) sequences, the one or more PN sequences offset quadrature phase shift keying (QPSK) modulated; and convert the received radio signal into a complex baseband signal sampled in a chip clock;

a differential demodulator configured to generate a demodulated signal by differential demodulation of the complex baseband signal sampled in the chip clock;

a sequence providing unit configured to provide one or more derived sequences, each derived sequence assigned to a particular PN sequence of the one or more PN sequences and including at least one derived chip with a first positive index, the at least one derived chip with the first positive index having a value derived by exclusive ORing (XORing) a PN chip with the first positive index and an index-wise preceding PN chip;

a correlation unit configured to calculate correlation results measuring conformity of the demodulated signal to each of the one or more derived sequences by correlating the demodulated signal with each of the one or more derived sequences; and an evaluation unit configured to derive the values of the at least one data symbol using a selected one of the one or more derived sequences with a highest degree of conformity to the demodulated signal determined by evaluating the correlation results.

13. The incoherent receiving unit according to claim 12, wherein the differential demodulator is designed such that the demodulated signal has soft information values.

14. The incoherent receiving unit according to claim 13, further comprises:

a delay unit configured to delay the sampling values of the complex baseband signal by one chip period;

a first complex multiplication unit configured to calculate first complex products by multiplying conjugated complex values of the delayed sampling values by the undelayed sampling values of the complex baseband signal; and a generation unit configured to generate the demodulated signal by calculating imaginary parts of second complex products from the first complex products and a complex factor suitable for frequency offset correction and the differential demodulator.

15. The receiving unit according to claim 13, wherein the differential demodulator comprises:

a delay unit configured to delay the sampling values of the complex baseband signal by one chip period;

a first multiplier configured to calculate first products by multiplying real parts of the delayed sampling values by imaginary parts of the undelayed sampling values of the complex baseband signal;

a second multiplier configured to calculate second products by multiplying the imaginary parts of the delayed sampling values by the real parts of the undelayed sampling values of the complex baseband signal; and a first adder configured generate the demodulated signal by subtracting the second products from the first products.

16. The receiving unit according to claim 13, wherein the correlation unit is configured to correlate, during calculation of the correlation results the demodulated signal in each case with a number of derived chips, which is lower by one than a number of the PN chips contained in each PN sequence.

17. The receiving unit according to claim 12, further comprises an equalizer configured to suppress a direct component to equalize the demodulated signal.

18. The receiving unit according to claim 12, wherein the sequence providing unit comprises a memory unit for storing the one or more derived sequences.

19. The receiving unit according to claim 12, wherein the evaluation unit comprises:

an index determining unit configured to determine an index of the correlation result that has a maximum value; and an allocation unit configured to assign data symbols to said index whose symbol value is assigned to the PN sequence assigned the derived sequence with the index.

20. The receiving unit according to claim 12, wherein the evaluation unit comprises:

a maximum forming unit configured to determine a maximum correlation value of the correlation results;

an addition unit configured to calculate a sum by adding a constant;

a multiplier configured to calculate a product by multiplying the sum by a factor; and a value limiting unit configured to provide a signal quality by limiting the values of the product to a predefined value range, wherein the constant and the factor are selected in such a way that the provided signal quality completely covers the predefined value range.

21. A transmitting/receiving device comprising:

an antenna;

a transmitting unit coupled to the antenna for transmitting data, the transmitting unit configured to allocate at a transmitter side with pseudo-noise (PN) sequences of successive PN chips in a chip clock to each data symbol and to offset quadrature phase shift keying (QPSK) modulate the PN sequences allocated to the data symbols;

a receiving unit connected to the antenna; and a control unit configured to control the transmitting and receiving units, wherein the receiving unit comprises:

an internal receiver configured to convert a received radio signal into a complex baseband signal sampled in the chip clock, the received radio signal comprising at least one data symbol, the at least one data symbol allocated at a transmit side one or more PN sequences, the one or more PN sequences offset QPSK modulated; and a differential demodulator configured to generate a demodulated signal by differential demodulation of the complex baseband signal sampled in the chip clock;

a sequence providing unit configured to provide one or more derived sequences, each derived sequence assigned to a particular PN sequence of the one or more PN sequences and including at least one derived chip with a first positive index, the at least one derived chip with the first positive index having a value derived by exclusive ORing (XORing) a PN chip with the first positive index and an index-wise preceding PN chip;

a correlation unit configured to calculate correlation results measuring conformity of the demodulated signal to each of the one or more derived sequences by correlating the demodulated signal with each of the one or more derived sequences; and an evaluation unit configured to derive the values of each data symbol using a selected one of the one or more derived sequences with a highest degree of conformity to the demodulated signal determined by evaluating the correlation results.

22. The device according to claim 21, wherein the transmitting/receiving device is an integrated circuit.

* * * * *

UNITED STATES PATENT AND TRADEMARK OFFICE
CERTIFICATE OF CORRECTION

PATENT NO.      : 8,223,888 B2  
APPLICATION NO. : 11/953007  
DATED           : July 17, 2012  
INVENTOR(S)     : Frank Poegel Page 1 of 1

It is certified that error appears in the above-identified patent and that said Letters Patent is hereby corrected as shown below:

In the Claims:

Col. 18, Ln. 13: After "The" and before "receiving" delete "incoherent".

Col. 18, Ln. 16: After "The" and before "receiving" delete "incoherent".

Signed and Sealed this
Fourteenth Day of October, 2014

Michelle K. Lee
*Deputy Director of the United States Patent and Trademark Office*